United States Patent [19]

Burke

[11] 3,917,855

[45] Nov. 4, 1975

[54] EDIBLE COLLAGEN CASING COATED WITH AN EDIBLE POWDER AND METHOD OF PREPARING SAME

[75] Inventor: Noel L. Burke, Danville, Ill.

[73] Assignee: Tee-Pak, Inc., Chicago, Ill.

[22] Filed: Mar. 12, 1974

[21] Appl. No.: 450,526

[52] U.S. Cl. ................ 426/92; 426/140; 426/278; 426/289
[51] Int. Cl.² ........................................... A23L 1/31
[58] Field of Search ............ 426/92, 105, 125, 135, 426/138, 140, 278, 289, 296; 117/16, 18

[56] References Cited
UNITED STATES PATENTS

| 3,123,483 | 3/1964 | McKnight .......................... 426/140 |
| 3,186,860 | 6/1965 | Jones ................................. 117/18 X |
| 3,260,611 | 7/1966 | Weidenhammer et al............ 117/18 |
| 3,743,521 | 7/1973 | Rasmussen.......................... 426/135 |

OTHER PUBLICATIONS

"The Washington Post," Sept. 5, 1974, p. A2.

Primary Examiner—Hyman Lord
Attorney, Agent, or Firm—Neal J. Mosely; Russell L. Brewer

[57] ABSTRACT

An edible sausage casing is produced having improved external surface characteristics in that the casing when stuffed with a sausage emulsion has improved slidability over a table surface, improved slidability of the links against themselves, and improved surface characteristics for reducing surface friction in process equipment. The edible sausage casing has distributed over its external surface an edible, substantially spherical, non-hygroscopic powder, said powder having a particle size of from about 0.5 to 35 microns.

8 Claims, No Drawings

EDIBLE COLLAGEN CASING COATED WITH AN EDIBLE POWDER AND METHOD OF PREPARING SAME

BACKGROUND OF THE INVENTION

In the past, casings useful in the manufacturing of sausages such as frankfurters, bolognas, salamis, and the like, were prepared from the intestines of various animals, such as cattle, hogs, sheep. The intestines were removed from the slaughtered animal and thoroughly cleaned by processes well known in the art.

Prior to about 1925, substantially all of the sausage casings were natural casings prepared from animal intestines. Since that time there have been developed several types of synthetic sausage casings, principally of regenerated cellulose, which are used in preparation of the major portion of sausages made and sold today. With the discovery of synthetic casings, the ability to produce meat products in the form of sausages has increased substantially. As might be expected, the basic problem with natural casings was their restricted supply for the large demand of the respective meat products.

Regenerated cellulose casings, although highly satisfactory, for the manufacture of "wieners", were not as satisfactory for the processing of pork sausage. One of the basic objections of cellulose as a casing material for pork sausage was that it was not edible. A second objection was that they did not transmit the fat in the pork sausage and shrink with the meat during cooking.

Edible sausage casings employing collagen as the major component have been developed and they satisfy the basic problems encountered with the cellulose casing, i.e., they are edible and they transmit the fat and shrink with the meat during cooking.

DESCRIPTION OF THE PRIOR ART

Edible sausage casings employing collagen as the major component typically are produced as follows: A hide collagen is converted into a finely divided fibrillar form, formed into an aqueous collagen slurry, e.g., containing from about 2 – 6% collagen and then extruded as a thin-walled tube. The extruded collagen casing then is passed into a coagulating bath, typically containing ammonium sulfate or sodium sulfate with a small proportion of alkali, for dehydrating the collagen slurry and neutralizing any acid present in the casing thereby forming a coherent collagen film. In a further treatment the salt-coagulated collagen film is hardened or tanned with a suitable tanning agent, e.g., an aluminum salt complex or a dialdehyde so that the film will have sufficient strength to withstand further processing. After the tanning operation, the collagen film is passed through a plasticizing bath, e.g., aqueous glycerin. The resultant casing then is dried, shirred, and packaged for sale to the meat processor. The shirred edible collagen casings then are stuffed by the meat processor with a pork sausage emulsion and packaged for sale to the consumer generally in the uncooked state.

After substantial inspection of meat packing facilities, and substantial observation of stuffing operations, it was noted that the sausages processed in collagen casings were often difficult to package for sale to the consumer. Often, the employees of the processor mashed or pushed the sausages into the small packing cartons for 8 – 10 sausage links and caused destruction of the integrity of the link. As might be expected, the destruction of the integrity of the sausage link resulted in a package having an undesirable aesthetic value to the homemaker.

Several attempts were made to improve the surface characteristics of the edible collagen casings so that the sausages might be packaged in appropriate containers without substantial mashing or destruction of the sausage link. Various additives, e.g., surfactants, carboxymethyl cellulose, acetylated monoglycerides, emulsified mineral oil, etc., had been added to the glycerin bath for the purpose of improving the external surface characteristics of the sausage casing. On inspection of these casings in the meat processing plant, it was deemed the improvements to the sausage casings were marginal, i.e., the sausage links processed in these casings remained difficult to package.

Sausage casing strands were coated with powdered calcium stearate, microcrystalline wax, gelatin, wax coated starches, and starch coated waxes. These powdered materials were deemed to marginally improve the surface characteristics of the casings.

SUMMARY OF THE INVENTION

This invention relates to an improvement in edible sausage casings and more particularly to collagen sausage casings. The improved edible sausage casing has distributed over its external surface an effective proportion of an edible (non-toxic), substantially spherical, nonhygroscopic powder having a particle size from about 0.5 – 35 microns for enhancing the slidability of sausages processed in such casings against themselves and over other surfaces.

The invention also relates to a method for improving the lubricity and slidability of edible casings which comprises distributing the above edible powder over the external surface of the casing in a proportion effective for accomplishing such result. By distributing the edible powder over the sausage casing, the casing when stuffed with a sausage emulsion will permit the sausages to readily slide against themselves and across most tables, e.g., stainless steel surfaces, encountered in a meat processing plant.

The advantages of this invention pertain to the improvement of the external surface characteristics of edible sausage casings and particularly collagen casings. These advantages include: improved slidability of sausage links against themselves without substantial sticking as is normally encountered with sausages prepared in conventional non-treated edible sausage casings; improved slidability of sausage links so that during the stuffing operation the newly formed links will readily slide on a table without a substantial frequency of tearing or breaking; improved handling and packing sausage links into conventional packages without substantial destruction of the integrity of the sausage link; reduced abrasion encountered during linking, particularly with tie linkers; and reduced friction of the sausage casing in the sausage processing machinery, thereby reducing breakage of the casings. What is surprising is that all of these advantages can be accomplished by the addition of a very small innocuous proportion of powder.

DESCRIPTION OF THE PREFERRED EMBODIMENTS

Although not intending to be bound by theory, it is believed that one of the reasons the edible powder improves the slidability of sausage links processed in the casing is that the powder substantially reduces the area in contact with a given surface. This reduced area, of course, reduces surface friction and, hence, increased the slidability of the sausages against themselves and across table surfaces. It is also believed the edible powder acts as a miniature "ball bearing" with these ball bearings permitting the sausages to roll or slide agaist themselves.

The powder suitable for distribution over the external surface of the sausage casings should be spherical or at least substantially spherical in shape. Spherical powders can be prepared in a variety of ways, e.g., through emulsion or suspension polymerization, vaporization and condensing or by spray drying. When the powder is prepared by grinding, it often is of irregular shape and non-spherical. These powders often are ineffective for achieving the results contemplated by this invention.

The edible powder which is applied to the sausage casings should have a particle size of from about 0.5 – 35 microns. When the particle size exceeds about 35 microns, substantial deterioration in the surface frictional characteristics of the sausage casings is noted, i.e., the sausage links do not slide or roll against themselves as readily as they do when smaller particle size powders are employed. It is believed that the large particle size of conventional additives such as calcium stearate, microcrystalline wax, and wax coated starches generally available on a commercial basis and utilized in the prior art makes these components ineffective for achieving the results desired in this invention. These materials typically have a particle size in excess of 50 microns and typically upwards of 75 microns.

As stated before, those materials when distributed over sausage casings, did not improve the surface frictional characteristics of the casing, or if they did, this improvement was marginal. Even the preferred polyolefin powders which have particle sizes in excess of about 40 microns did not produce the highly desirable surface characteristics produced by the smaller diameter powders. One reason which might explain the fact that the large particle size powders did not work as well as the smaller particles is that the loading of the powder must be substantially greater than that required of the smaller diameter powders to achieve the same number of particles per foot of casing. Generally, if these high loadings of powder were employed to achieve a similar proportion of powder particles per foot of casing, the casing would be unsuitable for the processing of sausages for other reasons, e.g., for FDA and culinary reasons. Particle sizes of less than 0.5 microns are usually difficult to obtain and, therefore, this limit is employed for reasons of efficiency and economy.

The edible powder should be non-hygroscopic to the extent that it does not absorb more than 0.002 g of water per gram of powder under total immersion. When the powder is substantially more hygroscopic, i.e., it absorbs more than about 0.003 g water per gram of powder, the powder normally does not improve the surface characteristics of the casing. It is believed the moisture in the powder tends to prevent the powder from acting as a miniature ball bearing and interferes with the shape and surface characteristics thereof. Further, the moisture in the particle increases the diameter of the particle and thereby increases the area of contact with a given surface.

Several factors enter into the determination of the proportion of powder to be applied to the casing. For example, it is important that the proportion of powder on the casing be limited to the extent it does not interfere with the taste of the casing. In other words, the powder should be innocuous to the consumer. Often, where too much powder is applied to the casing, one may think that he is consuming grit along with the sausage. Secondly, the proportion of powder should be limited to the extent it does not exceed FDA or Department of Agriculture standards. Many powders approved for some food uses by the FDA and Department of Agriculture can be employed in very limited proportions. On the other hand, it is important that the powder be applied in an effective proportion so that the surface properties of the sausage casing are improved as described. Generally, it has been found that an edible powder can be applied in such proportion which produces from about 1 – 100 ppm powder (parts per million) based upon the weight of the stuffed sausage in the casing without detrimental results. Stated a different way, the powder generally is applied to the casing either shirred or unshirred, in a proportion of from about 0.00015 – 0.015 mg per mg of casing. For polyolefin powder this preferred proportion is from 0.00075 – 0.0075 mg/mg casing. These values are guidelines and can be varied as desired in accordance with the type of powder employed.

A wide variety of powders, either natural or synthetic, are contemplated by this invention. Two classes of synthetic powders which are contemplated are the organic polymers derived from the polymerization of vinyl and olefinic monomers. By the employment of an emulsion or suspension polymerization process, it is possible to generate particles which are small and uniform in size and substantially spherical in shape. These are two important reasons why polymers and emulsion or suspension polymerization processes are preferred for generating the powder. As is known, in grinding operations, it is difficult to screen particles within the size range contemplated by this invention and it is difficult to generate substantially spherical particles.

Examples of vinyl monomers which are suited for forming polymeric particles include vinyl acetate, vinyl chloride, vinylidene chloride, butadiene, styrene, lower alkyl esters of acrylic and methacrylic acid where in the alkyl portion has from about 1 – 6 carbon atoms, divinyl benzene, acrylic and methacrylic acid, acrylamide, methylvinyl ketone, ethyl diallyl ether, and the like.

Olefinic monomers can also be polymerized to form suitable olefinic polymers include propylene, butylene, and ethylene. Of these, ethylene is the preferred olefinic monomer.

Another class of polymers useful for practicing the invention include cellulosic polymers and derivatives thereof. Examples of such cellulose polymers include cellulose acetate, cellulose butyrate, cellulose acetate-butyrate, cellulose propionate, and the like.

Examples of natural materials or materials obtained from a vegetable or animal source include calcium stearate, solid triglycerides with the fatty acid portion having at least 18 carbon atoms, microcrystalline wax, wax coated starches, and the like. Although natural materials can be used for practicing this invention they generally are not preferred for reasons that it is difficult to synthesize powders having the desired particle size and shape.

Other polymeric materials can be used for practicing this invention and include polymeric polyisocyanates, polyesters, phenol-aldehydes, melamine-aldehydes, polyamides, e.g., nylon, polyacetals, polyurethanes, polyisocyanates, polycarbonates, epoxys, such as the epoxy resin of Bis-phenol A and epichlorohydrin, and the like. The primary feature of the powders, as mentioned before, is that the powder size be within the range specified and also have the other remaining qualities.

In a preferred embodiment of this invention, the edible powder applied to the collagen casing is a polyethylene powder having a particle size of from about 2 – 15 microns in size. The powdered polyethylene is distributed substantially uniformly over the shirred collagen casing so that when the casing is stuffed with a sausage emulsion the proportion of powder is from about 1 – 10 ppm on the basis of the sausage in the casing. Stated another way, the polyethylene powder is applied to the casing in a proportion of from about 0.00015 – 0.0015 mg per mg of shirred casing. Although higher proportions of polyethylene powder can be applied to the casing without deleteriously affecting the surface qualities of the casing, these limits are employed by virtue of FDA rulings.

Because polyethylene powder is susceptible to a buildup of an electrostatic charge, a finely divided silica such as fumed silica is added to the powder. One type of fumed silica is sold under the trademark "Cab-O-Sil" and is added in a proportion of about 0.1 – 2% by weight of the powder. The addition of the fumed silica to the powdered polyethylene improve the flow characteristics of the powder and permits it to be sprayed or dusted onto the casing from conventional applicators without substantial agglomeration.

The edible powder can be applied to the sausage casings in a multitude of ways. One of the simplest ways is to dust the powder over the surface of the casing either in its shirred or unshirred state. Sometimes, though, the application of the powder prior to shirring tends to interfere with the shirring process. The surface of the casing becomes slightly slippery when dusted with the powder and often does not permit the formation of a compact pleat. The powder can be applied by roller, by spraying through a nozzle or by conventional electrostatic processes to the casing. Each of these processes for applying a powder to a substrate, in this case an edible sausage casing, is well known in the art.

The following examples are provided to illustrate preferred embodiments of the invention and are not intended to restrict the scope thereof. All percentages are expressed as weight percentages.

EXAMPLE 1

A collagen casing having improved lubricity and slidability is prepared by dusting a polyethylene powder having a particle size of from about 2 – 15 microns over a shirred collagen casing having an unshirred inflated diameter of 21 mm, an unshirred length of 50 feet, and a weight of 410 mg/per foot. The polyethylene powder is sold under the trademark of "Microthene" by USI Chemical. The powder is applied to the shirred collagen casing in a proportion of 0.75 mg/foot of total casing or about 0.0018 mg/mg of casing. This level of addition of polyethylene powder to the shirred collagen casing is equivalent to yield about 8 – 10 ppm polyethylene powder basis the final sausage product. This level also is about the maximum permitted to date by the FDA. The resultant sausages readily slide across stainless steel tables and can be manually packaged in small packages of 8 – 10 links without destroying the integrity of the sausage links.

When similar but untreated collagen casings were stuffed with a sausage emulsion, it was observed that the sausage links did not slide readily across the stainless steel tabletop surface nor did they slide readily against themselves. The sausages were difficult to place manually in packages and there was a substantial occurrence in the destruction in the integrity of the sausage links.

EXAMPLE 2

Collagen casings were prepared in accordance with Example 1 except that 0.375 mg were dusted on the 410 mg of shirred collagen casing. This level of addition is equivalent to about 5 ppm polyethylene powder basis the final sausage product. The resultant casings had excellent slidability across stainless steel tabletop surfaces and the links readily slid against themselves. These sausage links were easy to package in small containers and the frequency of any destruction of the integrity of the sausage links was small.

EXAMPLE 3

Collagen casings were prepared in accordance with Example 1 except that 0.6% Cab-O-Sil (a fumed silicon made by vapor phase hydrolysis of a volatile silicon compound) by weight is added to the polyethylene powder. The addition of the Cab-O-Sil to the polyethylene powder tends to reduce electrostatic charge buildup in the powder and to improve the ability of the polyethylene to be uniformly distributed over the collagen casing.

EXAMPLE 4

Collagen casings were prepared in accordance with Example 1 except that the polyethylene powder was applied to the unshirred collagen casing. Sausages processed in these casings readily slid over stainless steel tabletop surfaces and readily slid against themselves permitting easy packaging. There were very few occurrences in the destruction of the integrity of the sausage links. It was observed that shirring was difficult on occasion and this was believed due to the slippery surface of the collagen casing.

What is claimed is:

1. An edible collagen sausage casing having distributed over its external surface an effective proportion of an edible, substantially spherical, non-hygroscopic, non-toxic powder having a particle size of from about 0.5 – 35 microns, in the amount of 0.00015 – 0.015 mg./mg. casing, for substantially enhancing the slidability and lubricity of the casing to permit sausages processed therein to slide and roll against themselves.

2. The sausage casing of claim 1 wherein said polymeric powder is selected from the group consisting of vinyl and olefinic polymers.

3. The sausage casing of claim 2 wherein said casing is a shirred casing.

4. The sausage casing of claim 3 wherein said olefinic polymer is polyethylene, the particle size of said powder is from 2 – 15 microns and the proportion of powder is from 0.00075 – 0.0075 mg/mg casing.

5. A method for improving the lubricity and slidability of an edible collagen sausage casing which comprises distributing over the external surface of said edible sausage casing an effective proportion of an edible, substantially spherical, non-hygroscopic, non-toxic powder selected from the group consisting of polymeric powder, calcium stearate, solid triglycerides with the fatty acid portion having at least 18 carbon atoms, microcrystalline wax, and wax coated starches in the amount of 0.00015 – 0.015 mg./mg. casing, for improving said lubricity and slidability, said powder having a particle size of from about 0.5 – 35 microns.

6. The method of claim 5 wherein said polymeric powder is selected from the group consisting of vinyl and olefinic polymers.

7. The method of claim 6 wherein said casing is a shirred casing.

8. The method of claim 7 wherein said olefinic polymer is polyethylene, the particle size of said powder is from 2 – 15 microns and the proportion of powder is from about 0.00075 – 0.0075 mg/mg casing.

* * * * *